United States Patent [19]
Levy et al.

[11] 4,222,162
[45] Sep. 16, 1980

[54] SCREEN REPAIR

[76] Inventors: Mark A. Levy, 8605 SW. 147 Ter., Miami, Fla. 33134; Jack R. Tester, 8340 SW. 164 St., Miami, Fla. 33126

[21] Appl. No.: 964,690

[22] Filed: Nov. 29, 1978

[51] Int. Cl.³ .............................................. B23P 7/00
[52] U.S. Cl. .................................... 29/402.09; 245/1; 29/402.14
[58] Field of Search ............ 29/401 E, 402.01, 402.09, 29/402.11, 402.12, 402.14; 245/1, 2

[56] References Cited
U.S. PATENT DOCUMENTS

| | | | |
|---|---|---|---|
| 276,100 | 4/1883 | Vedder | 404/22 |
| 1,324,845 | 12/1919 | Osgood | |
| 1,749,755 | 3/1930 | Downer | 245/2 |
| 1,792,594 | 2/1931 | Litwin | 245/1 |
| 1,927,826 | 9/1933 | Friday | 156/14 |
| 1,998,033 | 4/1935 | Tucker | 156/14 |
| 2,241,257 | 5/1941 | Gronberg | 29/402.09 |
| 2,272,196 | 2/1942 | Gittins | 245/2 |
| 2,283,803 | 5/1942 | Gittins | 156/14 |
| 2,487,830 | 11/1949 | Robins | 28/73 |
| 2,717,437 | 9/1955 | De Mestral | 428/95 |
| 3,009,235 | 11/1961 | De Mestral | 428/89 |
| 3,138,841 | 6/1964 | Naimer | 24/204 |

Primary Examiner—Francis S. Husar
Assistant Examiner—V. K. Rising
Attorney, Agent, or Firm—Martin L. Faigus

[57] ABSTRACT

A patching system and method for repairing a screen having a defect in it employs two patches interconnectable through the screen in overlying relationship with the defect.

15 Claims, 3 Drawing Figures

SCREEN REPAIR

TECHNICAL FIELD

This invention relates to the field of screen repair, and more specifically to a patching system and method for repairing a screen having a defect in it.

DESCRIPTION OF THE PRIOR ART

It is not uncommon for screens employed in doors and windows to become torn, cut, or otherwise damaged. When this occurs insects can pass through the screen; creating very undesirable living conditions.

For decades the most common technique for repairing screens has been to secure a single patch, itself formed of a screen material, to the screen in overlying relationship with the defect. This type of patch generally is cumbersome to work with, is extremely unsightly, and sometimes includes wire-like fasteners that can cut or otherwise injure a person attempting to repair the screen. Moreover, these fasteners sometimes project outwardly from the screen, and can catch onto articles of clothing and rip them when individuals accidently brush against the screen. In any event the prior art wire mesh patches can hardly be said to be "decorative" by any reasonable definition of that term.

The following patents, which were considered in the preparation of this application, disclose various different types of wire mesh patches for use in repairing damaged screens: U.S. Pat. Nos. 1,324,845 (Osgood); No. 1,792,594 (Litwin); No. 2,272,196 (Gittens); No. 2,283,803 (Gittens); No. 2,487,830 (Robbins II) No. 1,927,826 (Friday); No. 2,241,257 (Gronberg); No. 1,749,755 (Downer) and No. 1,998,033 (Tucker).

U.S. Pat. No. 276,100, issued to Vedder, discloses the use of single decorative blocks, such as those indicated at B in FIGS. 3, 5 and 7–9, to close openings in a lattice structure. Vedder is in no way concerned with the problems associated with repairing defects in torn or damaged screens, and does not remotely suggest a unique patching system and method of the type forming the subject matter of the present invention.

DISCLOSURE OF THE INVENTION

A patching system for repairing a screen having a defect in it includes two separate patches adapted to be positioned on opposite sides of the screen, each patch including a cover section adapted to overlie the defect and mechanical fastening means adapted to face inwardly toward the screen, the mechanical fastening means of one patch being mechanical connectable to the fastening means of the other patch through the screen and with the cover sections overlying the defect. Most preferably the cover sections are formed into decorative shapes, such as flowers, animals and the like, and thereby provide a decorative appearance when connected to the screen. Moreover, since the mechanical fastening means are positioned between the cover sections they cannot be seen easily, and therefore do not detract from the decorative appearance of the patching system. In fact, in the preferred embodiment of this invention the decorative cover sections are mirror images of each other when they are connected through the screen so that the inwardly projecting fastening means are not viewable through the screen.

It is within the broad scope of this invention to form the cover section and mechanical fastening means of each patch as a single, unitary member. However, most preferably the cover section of each patch is separately formed from the mechanical fastening means and the mechanical fastening means is secured to less than fifty percent of the area of the inwardly facing surface of the cover section. This is primarily for the purpose of reducing the cost of the patching system. In addition, it is preferred to maintain the mechanical fastening means of each patch generally in the medial region of the decorative cover section so that it will not be exposed to view in the event that the two patches are slightly misaligned when connected together through the screen.

In accordance with the method of this invention it is most desirable to position the two patches on opposite sides of the screen with their mechanical fastening means aligned with both undamaged and damaged screen areas. The mechanical fastening means aligned with the undamaged screen areas will be forced through the interstices thereof to aid in preventing the two patches from sliding relative to each other. The mechanical fastening means passing through the defect, especially if the defect is a fairly large opening, will tend to provide strong mechanical interengagement because the wires forming the screen are not present in this area, and therefore do not interfere with the ability of the mechanical fasteners to become interconnected.

It is an object of this invention to provide a simple and reliable patching system for repairing defects in screens.

It is a further object of this invention to provide a decorative patching system for repairing defects in screens.

It is a further object of this invention to provide a decorative patching system in which mechanical fastening means thereof are covered when the system is in place to thereby prevent their exposure to view or contact.

It is a further object of this invention to provide a simple and reliable method for repairing defects in screens.

It is a further object of this invention to provide a method of repairing screens in a decorative fashion.

Other objects and advantages of this invention will become apparent by referring to the description of the best mode for carrying out this invention, taken in conjunction with the drawings.

DESCRIPTION OF THE BEST MODE FOR CARRYING OUT THE INVENTION

Figure 1:
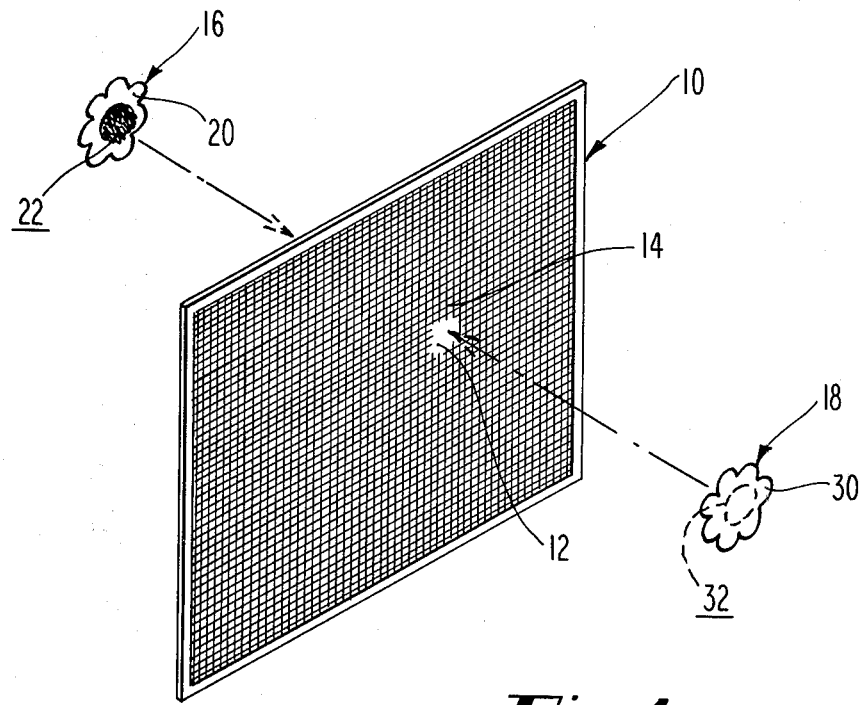
FIG. 1 is an exploded isometric view showing the patching system of this invention aligned for repairing a defect in a screen.

Referring to FIG. 1, a screen 10 is shown with a defect 12 in the form of an opening surrounded by undamaged screen areas 14. In accordance with this invention a patching system includes two patches 16 and 18 adapted to be secured over the defect 12 adjacent opposite sides of the screen 10.

Figure 2:
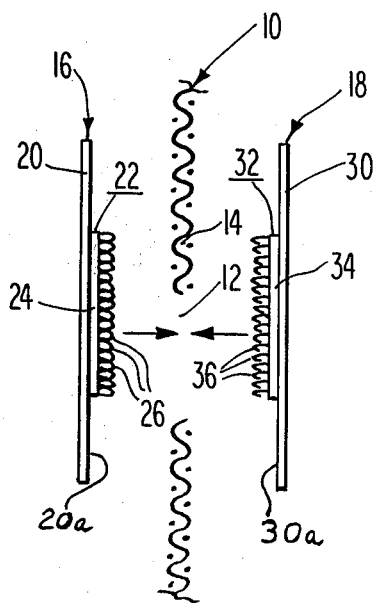
FIG. 2 is a sectional view through the defect in the screen showing the preferred position of the patching system relative to the defect in accordance with this invention, and with the patches and screen separated to show details of construction.

As can be seen best in FIGS. 1 and 2, the patch 16 preferably includes a substantially flat, decorative cover section 20. This cover section can be formed from any desired material, and most preferably is formed from a lightweight plastic. As can be seen best in FIG. 1 the cover section 20 is formed in the shape of a flower; however, it is understood that other decorative shapes and configuration can be employed in accordance with this invention.

The patch 16 further includes a fastener 22 having a woven backing 24 from which project mechanical fastening means in the form of raised pile hooking elements 26. As can be seen best in FIG. 2, the hooking elements 26 are in the form of closed loops extending generally perpendicular to the backing. The mechanical fastener 22 is connected through its backing 24 to the inner surface 20a of the cover section 20 through any suitable adhesive or bonding system. Within the broadest aspects of this invention the backing 24 can itself be the cover section of the patch 16.

Referring to FIGS. 1 and 2 the patch 18 is substantially identical to the patch 16. Specifically the patch 18 includes a substantially flat decorative section 30, preferably of lightweight plastic, with an inner surface 30a to which a fastener 32 is adhesively attached. As can be seen best in FIG. 2 the fastener 32 has a backing 34 with mechanical fastening means in the form of raised pile hooking elements 36 extending generally perpendicular therefrom. However, the hooking elements 36, unlike the elements 26, are opened hooks adapted to interconnect with the closed loop hooking elements 26. As in the case of the patch 16, the backing 34 can be employed as the cover section of the patch 18 within the broadest aspects of this invention.

Mechanical fasteners of the type described herein are commercially available; one such fastener being sold under the trademark Velcro. However, other types of fasteners having mechanical fastening means capable of passing through the interstices of the screen 10 also can be employed in this invention. Representative mechanical fasteners that can be employed in the patches 16 and 18 are disclosed in U.S. Pat. Nos. 2,717,437 and 3,009,235, both issued to De Mestral, and U.S. Pat. No. 3,138,841, issued to Naimer.

Figure 3:
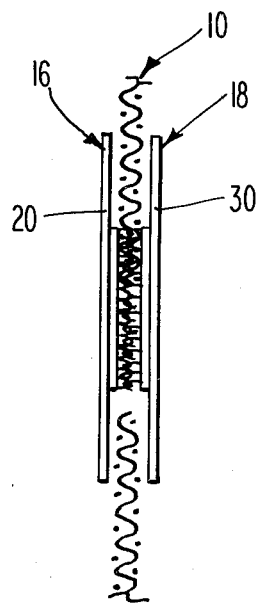
FIG. 3 is a sectional view similar to FIG. 2, but with the patching system assembled to complete the repair of the screen.

Referring to FIGS. 1 and 2 the decorative cover sections 20 and 30 preferably are mirror images of each other when positioned with their respective inner surfaces 20a and 30a facing each other. This is the relationship that is established to interconnect the two patches together through the screen 10 (FIGS. 2 and 3). When the cover sections 20 and 30 are properly aligned with each other in overlying relationship with the defect 12, only the outer surface of one patch is viewable from each side of the screen. In other words, due to the fact that the cover sections are mirror images of each other, the inwardly facing surfaces 20a and 30a, and the mechanical fasteners attached thereto, will not be viewable when the patching system is assembled properly to repair the screen 10 (FIG. 3).

Since the Velcro-type mechanical fasteners are expensive, the most economically feasible patching system is formed by attaching each fastener 22 and 32 to its respective cover section 20 and 30 over less than fifty percent of the surface area of the flat surfaces 20a and 30a. Most preferably the mechanical fasteners are attached over less than twenty-five percent of the surface area.

In accordance with the method of this invention it is most desirable to position the two patches 16 and 18 so that their respective mechanical fasteners 22 and 32 overlie both an undamaged screen area (e.g. 14) and a damaged, or defective screen area (e.g. opening 12). This arrangement is clearly shown in FIG. 2. When the patches 16 and 18 are connected together through the screen 10, as shown in FIG. 3, the hooking elements passing through the interstices in the undamaged screen areas 14 will aid in preventing the patches from sliding relative to the screen when subjected to lateral pressures or forces. However, the mechanical interconnection between the hooking elements is undamaged screen areas can be interfered with by the wires forming the screen and defining the interstices. Specifically, these wires can intercept and bend at least some of the hooking elements 26 and 36 to prevent their interconnection to each other through the screen.

The hooking elements 26 and 36 aligned with the defect 12, especially if the defect is large, will not experience interference from the wires forming the screen. Therefore, the ability of the mechanical fasteners to interconnect in the region of the defect will not be impaired by the wires forming the screen. Establishing a strong mechanical interconnection through the defect 12 aides in preventing separation between the patches 16 and 18.

Most preferably the mechanical fasteners 22 and 32 are adhesively attached in a medial region of their respective patches 16 and 18 to provide the most desired interaction between the hooking elements and the damaged and undamaged areas of the screen. Moreover, by positioning the mechanical fasteners in this medial region they will not be viewable, even if the patches 16 and 18 are slightly misaligned with respect to each other when connected to the screen in overlying relationship with the defect 12 (FIG. 3).

Although we have described the present invention with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather, only by the scope of the claims appended hereto.

We claim:

1. A patching system for repairing a screen having a defect in it, said system including two patches adapted to be positioned on opposite sides of said screen, each patch including a cover section adapted to overlie the defect and mechanical fastening means adapted to face inwardly toward the screen, the mechanical fastening means of one patch being mechanically connectable to the mechanical fastening means of the other patch through the screen and with the cover sections overlying the defect.

2. The patching system of claim 1 wherein the cover sections of the two patches are mirror images of each other when the patches are connected together through the screen.

3. The patching system of claim 1 wherein the cover sections of the two patches are substantially flat, have a decorative shape and are mirror images of each other when the patches are connected together through the screen.

4. The patching system of claim 1 wherein the cover section of each patch is formed separately from, but is attached to a fastener including the mechanical fastening means.

5. The patching system of claim 4 wherein the cover sections of the patches are substantially flat and the fasteners are attached to one flat surface of each cover section over less than fifty percent of the surface area of said one flat surface.

6. The patching system of claim 5 wherein the fastener of each patch is located only in a medial region of the one flat surface to which it is attached.

7. The patching system of claim 1 wherein the mechanical fastening means are interengageable hooking elements extending generally perpendicular to a substantially flat surface of the cover section of each patch, at least some of the hooking elements of one patch being adapted to pass through interstices in undamaged sections of the screen and to interconnect with at least some hooking elements of the other patch.

8. The patching system of claim 7 wherein the cover sections of the two patches are mirror images of each other when the patches are connected together through the screen.

9. The patching system of claim 7 wherein the cover sections of the two patches are substantially flat, have a decorative shape and are mirror images of each other when the patches are connected together through the screen.

10. The patching system of claim 7 wherein the cover section of each patch is formed separately from, but is attached to a fastener including the hooking elements.

11. The patching system of claim 10 wherein the cover sections of the patches are substantially flat and the fasteners are attached to one flat surface of each cover section over less than fifty percent of the surface area of said one flat surface.

12. The patching system of claim 11 wherein the fastener of each patch is located only in a medial region of the one flat surface to which it is attached.

13. A method of repairing a defect in a screen including the steps of positioning two separate patches on opposite sides of the screen in alignment with the defect to be repaired and mechanically interconnecting the patches through the screen to thereby cover the defect.

14. The method of claim 13 wherein the patches are mirror images of each other when positioned to be connected together, including the step of aligning the patches relative to each other when they are interconnected through the screen so that each patch overlies substantially the entire area of the other patch.

15. The method of claim 13 wherein each patch includes hooking elements extending outwardly from one surface thereof, including the step of inserting hooking elements through interstices in undamaged areas of the screen and through damaged areas of the screen to interconnect the patches together.

* * * * *